US012717768B2

(12) United States Patent
Lappala et al.

(10) Patent No.: US 12,717,768 B2
(45) Date of Patent: Aug. 25, 2026

(54) DELTALOG GENERATION OF LIST REFRESHES FOR EXTERNAL SYSTEMS IN A DATA MANAGEMENT SYSTEM

(71) Applicant: AMPERITY, INC., Seattle, WA (US)

(72) Inventors: Colin Lappala, Shoreline, WA (US); Jennifer Nicole Frank, Louisville, CO (US)

(73) Assignee: AMPERITY, INC., Seattle, WA (US)

( * ) Notice: Subject to any disclaimer, the term of this patent is extended or adjusted under 35 U.S.C. 154(b) by 105 days.

(21) Appl. No.: 18/442,419

(22) Filed: Feb. 15, 2024

(65) Prior Publication Data

US 2025/0265237 A1 Aug. 21, 2025

(51) Int. Cl.

*G06F 16/23* (2019.01)
*G06F 16/2455* (2019.01)
*G06F 16/27* (2019.01)

(52) U.S. Cl.

CPC ...... *G06F 16/2358* (2019.01); *G06F 16/2456* (2019.01); *G06F 16/27* (2019.01)

(58) Field of Classification Search

CPC ... G06F 16/2358; G06F 16/2456; G06F 16/27
USPC .......................................................... 707/625
See application file for complete search history.

(56) References Cited

U.S. PATENT DOCUMENTS

2006/0112018 A1* 5/2006 Lee ......................... H04L 67/63 705/59
2008/0270980 A1* 10/2008 Ahadian .................. G06F 8/34 717/109
2016/0103908 A1* 4/2016 Fletcher ............. G06F 3/04842 707/722
2018/0075095 A1* 3/2018 Srivastava ............ G06F 16/213
2021/0011891 A1* 1/2021 Soza ....................... G06F 16/23
2024/0012830 A1* 1/2024 Fink .................... G06F 16/2365
2024/0354301 A1* 10/2024 Kadado ............... G06F 16/2455

* cited by examiner

*Primary Examiner* — Cam Y T Truong
(74) *Attorney, Agent, or Firm* — George David Zalepa; Greenberg Traurig, LLP

(57) ABSTRACT

In some implementations, the techniques described herein relate to a system including: a database storing a dataset, the database including a persistent storage device; and a connector, the connector including a computing device configured to access data stored in the database and transfer data and commands to an external system, the connector configured to: update a deltalog responsive to a change in the dataset, the deltalog storing one or more of additions or deletions to data in the dataset, determine that a list refresh is needed for the external system, compute a changeset based on the deltalog and the dataset, the changeset representing one or more of additions or deletions to the dataset, and issue at least one application programming interface call to the external system based on the changeset to update a list of records stored by the external system.

17 Claims, 6 Drawing Sheets

DELTALOG GENERATION OF LIST REFRESHES FOR EXTERNAL SYSTEMS IN A DATA MANAGEMENT SYSTEM

BACKGROUND

Users frequently store canonical data in centralized data repository. Often, such users may wish to transfer portions or the entire data to an external system operated by a third-party. However, such external systems can vary drastically in the operations supported, resulting in difficulties in reliably performing the same operation regardless of the underlying external system.

DETAILED DESCRIPTION

Figure 1:
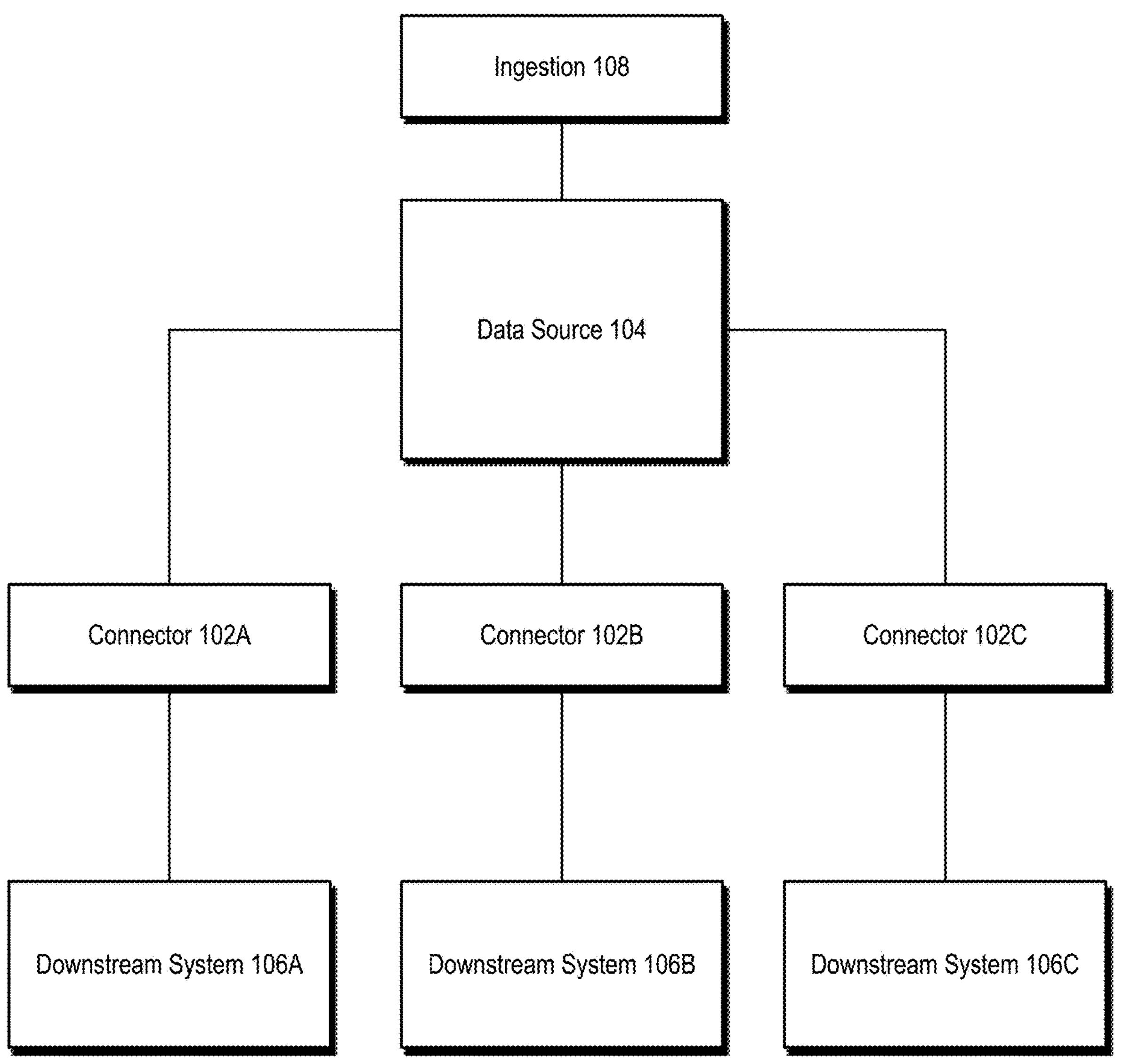
FIG. 1 is a block diagram of a system for providing data from a data source to a plurality of external systems using a connector pattern according to some embodiments of the disclosure.

A data management system (DMS) generally stores data on behalf of users. Such data may be stored, for example, as a set of records. As one example, a given record can represent an individual or entity such as a company. In many systems, the number of records may be substantial, on the order of millions for a single DMS user. In addition to storing data, the DMS may perform other functions on the underlying data such as entity resolution (e.g., identity resolution), clustering, and other value-added features. One example of a type of DMS is a customer data platform (CDP), although the disclosure is not limited to use with CDPs.

Oftentimes, users of a DMS will wish to share their data with other computing systems. Using a CDP as an example, the CDP may store a list of a business's customers. This business may wish to provide some or all of this list (and some or all of its attributes per record) to an external system as an audience to target content to.

To support these transfers, a DMS can implement a connector pattern, wherein each external system is associated with a dedicated connector which translates data stored by the DMS to a format useable by the external system. In some implementations, each external system may support some or more operations on a dataset held by the external system. Generally, these operations can be exposed as application programming interface (API) endpoints and can correspond to operations such as truncate, membership querying, appending records, removing records, etc. In some implementations, the API can further include record-level operations such as updating, removing, or adding attributes for records. Details of this approach are described herein in relation to the following figures.

In some implementations, the techniques described herein relate to a system including: a database storing a dataset, the database including a persistent storage device; and a connector, the connector including a computing device configured to access data stored in the database and transfer data and commands to an external system, the connector configured to: update a deltalog responsive to a change in the dataset, the deltalog storing one or more of additions or deletions to data in the dataset, determine that a list refresh is needed for the external system, compute a changeset based on the deltalog and the dataset, the changeset representing one or more of additions or deletions to the dataset, and issue at least one application programming interface call to the external system based on the changeset to update a list of records stored by the external system.

In some implementations, the techniques described herein relate to a system, wherein issuing at least one application programming interface call to the external system based on the changeset includes: issuing a first application programming interface call to the external system to replace the list of records with a new list of records stored in the dataset; and issuing one or more addition or deletion application programming interface calls to the external system to update of records stored by the external system.

In some implementations, the techniques described herein relate to a system, wherein issuing at least one application programming interface call to the external system based on the changeset includes: generating a set of addition or deletion application programming interface calls based on the changeset; and issuing the set of addition or deletion application programming interface calls to the external system to update of records stored by the external system.

In some implementations, the techniques described herein relate to a system, wherein updating a deltalog responsive to a change in the dataset includes: retrieving a current deltalog table; performing a left join on the current deltalog table and the dataset to obtain a joined dataset; identifying new rows in the joined dataset; identifying missing rows in the joined dataset; and merging addition records based on the new rows to the current deltalog table.

In some implementations, the techniques described herein relate to a system, wherein computing a changeset based on the deltalog and the dataset includes: reading a current deltalog table; performing a left join on the current deltalog table and the dataset to obtain a joined dataset; creating an additions data frame based on the joined dataset; and creating a deletions data frame based on the joined dataset.

In some implementations, the techniques described herein relate to a system, wherein updating a deltalog responsive to a change in the dataset includes: updating a plurality of rows in a deltalog table based on a committed field; deleting a plurality of rows based on the committed field; and persisting the deltalog table.

In some implementations, the techniques described herein relate to a system, wherein determining that a list refresh is needed for the external system includes one of periodically checking to determine if the list refresh is needed based on the deltalog or determining that the list refresh is needed upon detecting a change in the dataset.

In some implementations, the techniques described herein relate to a method including: updating a deltalog responsive to a change in the dataset, the deltalog storing one or more of additions or deletions to data in the dataset; determining that a list refresh is needed for the external system; computing a changeset based on the deltalog and the dataset, the changeset representing one or more of additions or deletions to the dataset; and issuing at least one application programming interface call to the external system based on the changeset to update a list of records stored by the external system.

In some implementations, the techniques described herein relate to a method, wherein issuing at least one application programming interface call to the external system based on the changeset includes: issuing a first application programming interface call to the external system to replace the list of records with a new list of records stored in the dataset; and issuing one or more addition or deletion application programming interface calls to the external system to update of records stored by the external system.

In some implementations, the techniques described herein relate to a method, wherein issuing at least one application programming interface call to the external system based on the changeset includes: generating a set of addition or deletion application programming interface calls based on the changeset; and issuing the set of addition or deletion application programming interface calls to the external system to update of records stored by the external system.

In some implementations, the techniques described herein relate to a method, wherein updating a deltalog responsive to a change in the dataset includes: retrieving a current deltalog table; performing a left join on the current deltalog table and the dataset to obtain a joined dataset; identifying new rows in the joined dataset; identifying missing rows in the joined dataset; and merging addition records based on the new rows to the current deltalog table.

In some implementations, the techniques described herein relate to a method, wherein computing a changeset based on the deltalog and the dataset includes: reading a current deltalog table; performing a left join on the current deltalog table and the dataset to obtain a joined dataset; creating an additions data frame based on the joined dataset; and creating a deletions data frame based on the joined dataset.

In some implementations, the techniques described herein relate to a method, wherein updating a deltalog responsive to a change in the dataset includes: updating a plurality of rows in a deltalog table based on a committed field; deleting a plurality of rows based on the committed field; and persisting the deltalog table.

In some implementations, the techniques described herein relate to a method, wherein determining that a list refresh is needed for the external system includes one of periodically checking to determine if the list refresh is needed based on the deltalog or determining that the list refresh is needed upon detecting a change in the dataset.

In some implementations, the techniques described herein relate to a non-transitory computer-readable storage medium for tangibly storing computer program instructions capable of being executed by a computer processor, the computer program instructions defining steps of: updating a deltalog responsive to a change in the dataset, the deltalog storing one or more of additions or deletions to data in the dataset; determining that a list refresh is needed for the external system; computing a changeset based on the deltalog and the dataset, the changeset representing one or more of additions or deletions to the dataset; and issuing at least one application programming interface call to the external system based on the changeset to update a list of records stored by the external system.

In some implementations, the techniques described herein relate to a non-transitory computer-readable storage medium, wherein issuing at least one application programming interface call to the external system based on the changeset includes: issuing a first application programming interface call to the external system to replace the list of records with a new list of records stored in the dataset; and issuing one or more addition or deletion application programming interface calls to the external system to update of records stored by the external system.

In some implementations, the techniques described herein relate to a non-transitory computer-readable storage medium, wherein issuing at least one application programming interface call to the external system based on the changeset includes: generating a set of addition or deletion application programming interface calls based on the changeset; and issuing the set of addition or deletion application programming interface calls to the external system to update of records stored by the external system.

In some implementations, the techniques described herein relate to a non-transitory computer-readable storage medium, wherein updating a deltalog responsive to a change in the dataset includes: retrieving a current deltalog table; performing a left join on the current deltalog table and the dataset to obtain a joined dataset; identifying new rows in the joined dataset; identifying missing rows in the joined dataset; and merging addition records based on the new rows to the current deltalog table.

In some implementations, the techniques described herein relate to a non-transitory computer-readable storage medium, wherein computing a changeset based on the deltalog and the dataset includes: reading a current deltalog table; performing a left join on the current deltalog table and the dataset to obtain a joined dataset; creating an additions data frame based on the joined dataset; and creating a deletions data frame based on the joined dataset.

In some implementations, the techniques described herein relate to a non-transitory computer-readable storage medium, wherein updating a deltalog responsive to a change in the dataset includes: updating a plurality of rows in a deltalog table based on a committed field; deleting a plurality of rows based on the committed field; and persisting the deltalog table.

FIG. 1 is a block diagram of a system for providing data from a data source to a plurality of external systems using a connector pattern according to some embodiments of the disclosure.

In the illustrated embodiment, a system includes a data source 104. In some implementations, this data source 104 can comprise a canonical repository of data stored by the system. For example, in a CDP, data source 104 can store records associated with customers of a business. The specific form of data source 104 is not limited and any storage mechanism that can provide data can be used. For example, data source 104 can comprise one or more relational databases such that data stored in data source 104 can be queried via a program language such as a structured query language (SQL) dialect. In some implementations, data source 104 can comprise a homogeneous data source or, alternatively, a heterogeneous data source. As used herein, a homogeneous data source refers to a data source that uses a single underlying technology (e.g., relational databases) while a heterogeneous data source comprises one that uses multiple, different types of data storage technologies (e.g., relational databases for persistence, key-value stores for caching, NoSQL databases for document storage, etc.). In some implementations, the data source 104 can include a query engine that supports a single query interface and manages translation of commands (e.g., SQL statements) into data access commands, thus abstracting the underlying storage mechanism of data source 104.

As illustrated, data source 104 receives data via a data ingestion gateway 108. In some implementations, data ingestion gateway 108 can perform a variety of functions. At its core, data ingestion gateway 108 can receive raw data, process the raw data, and write records to data source 104. Using a CDP as an example, data ingestion gateway 108 may receive customer data from a business. Data ingestion gateway 108 may perform clustering to determine if existing customers exist in data source 104 and either update an existing customer record in data source 104 or persist a new customer record in data source 104. Certainly, data ingestion gateway 108 may perform many other functions to ensure the integrity of data written to data source 104, however these operations are not limiting in this disclosure.

Once data is stored in data source 104, the owner of the data may wish to provide the stored data to other computing systems. In the CDP example, a business may wish to build a targeted advertising campaign to its customers. In general, this process involves extracting some of all of the records from data source 104 and providing those records to an external computing system to facilitate downstream operations. For example, a business may wish to advertise on a social media platform which supports programmatic audience building. In response, the business may extract a portion of its customer base (as represented by records in data source 104) and transmit attributes of those records to the social media platform which can construct the audience (using its internal data semantics) and continue to allow the business to build a campaign around that audience.

As illustrated, the system may interact with a variety of external systems (e.g., external system 106A, external system 106B, and external system 106C). Although only three external systems are illustrated, the disclosure is not limited as such. In some implementations, the external systems exist regardless of whether a business interacts with them. As discussed previously, in some systems, a business may manually extract data from data source 104 via, for example, custom SQL statements and receive a list of records (e.g., as a comma-separated value list). The business then can manually upload those records to the external systems and continue its downstream operations.

In contrast, the system of FIG. 1 illustrates the use of connectors (e.g., connector 102A, connector 102B, and connector 102C) to facilitate the programmatic update of user records in external systems (e.g., external system 106A, external system 106B, and external system 106C). For the avoidance of doubt, the operations of connectors described herein are fully automated and no human intervention is needed or allowed for their operation. Indeed, businesses may establish a connector and then the connector handles all operations autonomously. Thus, no personal behavior or relationships or interactions between people are managed by the system once a connector is established, nor is any mechanism provided to do so. In some implementations, data source 104, data ingestion gateway 108, connector 102A, connector 102B, and connector 102C form parts of a DMS (other components are not illustrated). Conversely, external system 106A, external system 106B, and external system 106C comprise third-party systems that are not part of the DMS but are capable of being called from the DMS.

As illustrated, a connector is generally mapped one-to-one to an external system. A given connector can be selected from a library of connector types (described in detail herein). In some implementations, the type of connector can be chosen automatically based on the operations supported by a given external system.

Specifically, each external system may have its own API for accessing data stored in its internal data repositories. Some external systems may support the truncation of data it manages. Other external systems may not support truncation and instead support other operations on the list such as listing, creating records, reading individual records, updating records, and deleting individual records. Further, some systems may only support writing an entire set of records and support no other operations.

For example, in a CDP context, an external system may allow its users to upload customer lists for building an audience and may support updating that audience by allowing the user to truncate the entire list (or parts thereof) and re-upload a replacement customer list. Other external systems may allow a user to upload a customer list then selectively add, update, or remove individual users. Finally, other external systems may simply support a one-time upload of a customer list to build an audience and may require a user to create an entirely new audience if an update is required.

It is these API semantics that drive the selection of a given connector for a given external system. By utilizing a connector pattern, the system can support any potential external system solely by using (or creating) a connector that is appropriate for the system. Further, as will be discussed, the connectors can be customized to enable a consistent set of operations and user experience regardless of the underlying external system.

Details of the operations of the connectors are provided further herein. In general, the below operations provide numerous technical improvements in the art of data transfers across networks. First, the connector pattern enables full refresh of lists of records, regardless of the underlying external system API semantics, thus enabling list refreshes regardless of the external system architecture. Currently, this is not possible in the art. Second, the connector operations reduce the number of external system API calls needed to update a list of records. This necessarily reduces network congestion and overhead and increases the performance of the entire system. Third, the connector improves the accuracy of list comparisons (e.g., system vs. external system) to reduce the "drift" between the canonical list of users stored by the DMS and the corresponding list stored by an external system. Such a synchronization improves the accuracy of the external system processing and reduces the need for update operations to correct this drift. Finally, the disclosed embodiments provide incidental technical improvements such as list refresh checkpointing and incremental recovery on error detection.

Before describing the improved operations of the connectors, a discussion of current approaches is provided here.

A current truncation approach to updating a list of records in an external system is as follows. First, an API call is made to the external system to truncate a current list of records maintained by the external system. Next, the DMS re-computes the canonical list of records based on its underlying data (e.g., data stored in data source 104). The DMS can then issue a second API call to the external system to insert the records in the canonical list. Since the current list stored by the external system is empty (due to truncation), this operates as a complete list refresh of the external system's list of records.

In contrast, a compare-based approach to updating a list of records in an external system is as follows. First, the DMS issues an API call to the external system to obtain the current list of users. The DMS then caches this list in a local storage device (e.g., an SQLite database). Then, the DMS can then obtain the canonical list and transmit the canonical list to the external system as an update. In this scenario, the external system may build a current list of records that includes duplicate records, stale records that are not in the canonical list, and accurate records. Thus, the DMS can compare the canonical list to the cache list and issue a series of delete API calls to the external system to correct the duplicate or stale records, resulting in an accurate list on the external system.

Figure 2:
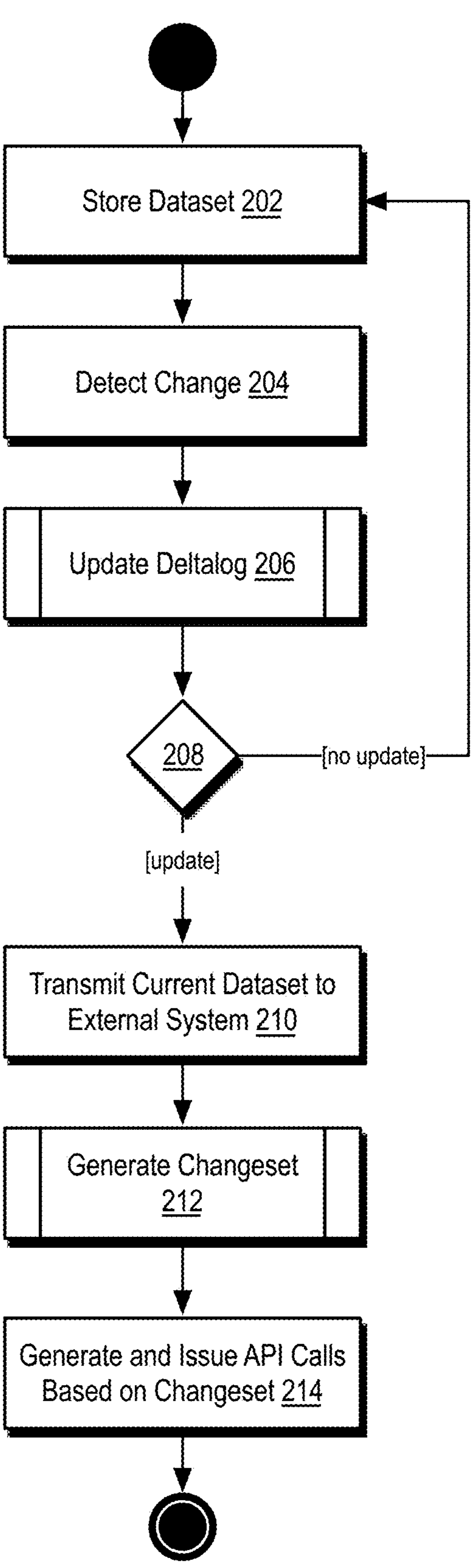
FIG. 2 is a flow diagram illustrating a deltalog-based approach to synchronizing dataset changes according to some embodiments of the disclosure.

FIG. 2 is a flow diagram illustrating a deltalog-based approach to synchronizing dataset changes according to some embodiments of the disclosure.

In step 202, the method can include storing a dataset.

In this step, the dataset refers to a canonical dataset stored by a DMS. In general, this dataset will be manipulated independently by other processes. For example, business may ingest more customer records which will cause insertions into the dataset. Businesses may also update or modify existing records which will causes updates to the dataset. Businesses can further remove customers, thus deleting records from the dataset.

In some implementations, the dataset can comprise a business's entire dataset (e.g., all records stored in data source 104). In other implementations, the dataset can comprise a subset of all records that are associated with a connector and an external system. This subset of records is used in the following description as a non-limiting example. In general, a given connector for a given external system can be initiated with a subset of records. This subset of records can be defined manually (e.g., as a list of unique identifiers identifying records) or conditionally (e.g., as a set of constraints or as an SQL view or projection of the entire dataset). In some implementations, a dataset can be stored as, for example, a Parquet file or other suitable data storage format.

In step 204, the method can detect a change in the dataset.

In some implementations, step 204 can be implemented as a hook such that any changes to the dataset stored in step 202 trigger further processing by the method. In other implementations, the method can proactively monitor a dataset (e.g., my periodically determining if any changes are made). In other implementations, step 204 can be optional. That is, in some implementations, the method can proceed to step 206 in response to a request to update a list of records on an external system. For example, a business may specify that the list of records on the external system be synchronized every week. Thus, in such implementations, the method need not detect changes in the dataset but rather proceeds to analyze differences in step 206 on a periodic basis.

In step 206, the method can include updating a deltalog.

In some implementations, the deltalog updated in step 206 is associated with a specific connector and a specific external system. In general, a deltalog represents a representation of changes (e.g., additions, deletions, updates) to a dataset over time. In some implementations, a deltalog can be stored in tabular format, such as a table in a relational database.

Although the following discussion describes modifications to entire records, the description may equally apply to attribute modifications to existing records. In some implementations, a single deltalog that tracks both the creation, modification and deletion of records as well as attribute changes can be used in, for example, a single table while in other implementations a attribute deltalog (e.g., table) separate from a list deltalog can be used for storing attribute changes separate from the creation, modification, and deletion of records. Attribute append operations can involve enriching records in downstream systems with additional attributes, a process that varies by connector and depends on the availability of fields from the source query. The attribute append deltalog can track changes to the contents (e.g., attributes) of dataset records. Fields within this deltalog can include, in addition to the fields described below, an attribute-hash which can comprise a canonical fingerprint over field values. This tracking can encompass a broad spectrum of dataset modifications, including but not limited to list refresh activities (additions and deletions) and extending to attribute updates.

In some implementations, a row in the deltalog can include fields including, but not limited to a comparison key identifier, an in-dataset flag, an updated-at timestamp, and a committed-at timestamp. In some implementations, the comparison key identifier can comprise any unique value that identifies a record such as an incremented identifier, a universally unique identifier, an email address, etc. In some implementations, the in-dataset flag can comprise a Boolean value indicating whether the record associated with the deltalog record is currently in the dataset. In some implementations, an updated-at timestamp can comprise a timestamp value (e.g., time since UNIX epoch) representing when the deltalog record was updated.

In some implementations, the committed-at time stamp can comprise a timestamp indicating when the deltalog record was committed to the dataset. In some implementations, the committed-at field can serve dual purposes. It can represent either a Boolean value or a timestamp. A Boolean field allows the field to indicate whether a deltalog record has been committed to the dataset, with nil representing false and any timestamp value representing true. This field can be used for tracking the commitment status of each deltalog entry, particularly in determining their eligibility for caching. Once a deltalog entry is marked as committed, it is utilized to filter out rows, preventing them from being forwarded as updates to downstream or external systems. Furthermore, in some implementations, a last-succeeded-at field can store the most recent timestamp when updates were successfully transmitted to the external system via the deltalog. The criterion for successful transmission varies but generally involves achieving a certain threshold of successful API calls relative to the total made during the update process. This field is updated following the successful completion of an update job, marking the end time of the job's execution.

The updated-at field can be assigned at the time a new entry is added to the deltalog, facilitating the tracking of the relative ages of entries. It is updated to the current time (now) when an existing row, identified by primary key, undergoes a change in its in-dataset status or, for attribute-specific deltalog entries, its attribute-hash.

In some implementations, the updated-at and committed-at fields can be used to define a time horizon to limit additions and deletions. Thus, the method will only send updates for changes occurring in this horizon (e.g., the past week). After that point, these updates are retained but not sent. For a given send, updates would include all additions and deletions for that window.

The process of committing entries in a new deltalog table can involve comparing the last-succeeded-at timestamp, which records the last instance of successful usage of the entire deltalog, with the updated-at timestamp of individual deltalog entries. Entries for which last-succeeded-at precedes updated-at are flagged as candidates for commitment. This comparison may include a buffer period (e.g., +3 days) to ensure comprehensive coverage of entries, assuming daily updates. Commitment of a row is signified by setting the committed-at field to a timestamp or the committed field to true, thereby excluding these entries from subsequent updates sent to downstream systems.

When changes to the dataset occur, the method updates this deltalog table accordingly. For example, when a record is added to the deltalog, the in-dataset flag is set to TRUE and the updated/committed timestamps are updated to the current time accordingly. When a record is updated, the in-dataset flag remains TRUE, the committed-at timestamp remains the same, and the updated-at timestamp is updated to the current time. When a record is deleted, the in-dataset flag is set to FALSE and the updated/committed timestamps are updated to the current time accordingly.

Figure 4:
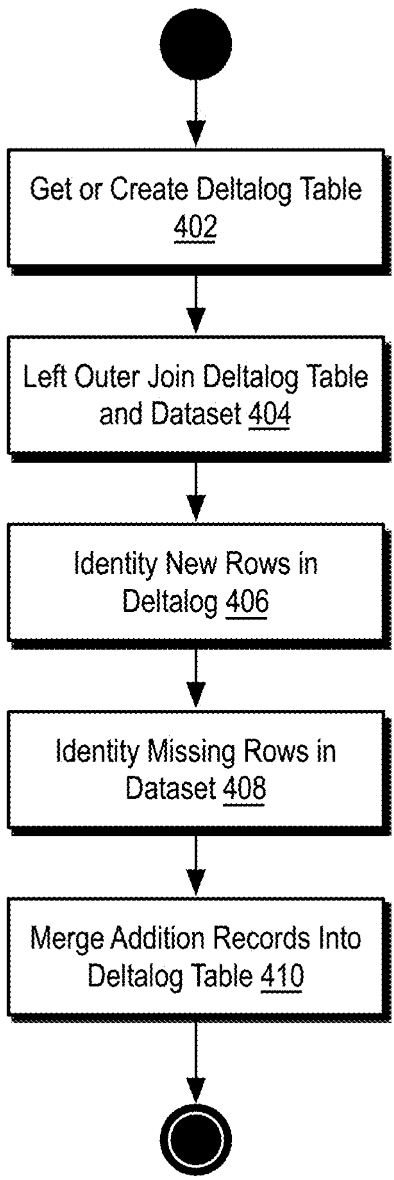
FIG. 4 is a flow diagram illustrating a method for updating a deltalog according to some embodiments of the disclosure.

Further details on the details of step 206 are provided more fully in the description of FIG. 4.

In step 208, the method determines if an update to an external system is necessary.

In some implementations, step 208 can include determining whether a list refresh is needed for the external system. In some implementations, determining whether a list refresh is needed for the external system can include periodically checking to determine if the list refresh is needed based on the deltalog. For example, the method can issue queries to the deltalog to determining if any additions or deletions have occurred within a past time horizon. Alternatively, determining whether a list refresh is needed for the external system can include determining that the list refresh is needed upon detecting a change in the dataset.

As discussed, the deltalog can be stored in a relational database table or other suitable file format. Using an SQL-compliant storage mechanism as an example the following example pseudo-queries can be used to identify any additions to the dataset based on the contents of the deltalog table:

```
SELECT*FROM deltalog
  WHERE in-dataset=1
  AND updated-at>(now—1 week)
  AND key_id in ("abc-123", . . . )
SELECT*FROM deltalog
  WHERE in-dataset=1
  AND committed-at>(now—1 day)
  AND key_id in ("abc-123", . . . )
```

Here, the queries select a subset (e.g., projection) of the deltalog table based on various conditions. Both query based on a list of key identifiers (e.g., the key identifiers of records associated with an external system) as well as a flag indicating that the records are currently in the dataset. The first query additionally filters the deltalog for those records that have last been updated within the last week. The second query additionally filters the records based on those records that have been newly added in the last day.

Similar to the foregoing, the following pseudo-queries can be used to identify deletions:

```
SELECT*FROM deltalog
  WHERE in-dataset=0
  AND updated-at>(now—1 week)
SELECT*FROM deltalog
  WHERE in-dataset=0
  AND committed-at>(now—1 day)
```

Here, the in-dataset flag is set to FALSE (0) to indicate records that are no longer in the dataset. Further, the committed/updated timestamp filters are used to reduce the number of records and focus on the most recent entries, as discussed above.

In some implementations, the method can issue these or similar queries and examine the size of the result set to determine if any changes have been made which warrant a list refresh. Generally, if both the number of additions and the number of deletions are zero, no update is needed and the method returns to step 202. However, if either result set size is non-zero, an update may be required and the method will proceed to step 210.

In step 210, the method can include transmitting a current dataset to an external system.

In some implementations, this step includes transmitting the entire relevant dataset to an external system as a list refresh. As discussed, this list refresh can include a subset of all records that are specific to an external system. Notably, in most scenarios, by transmitting a complete dataset, the method can ensure that the external system, at a minimum includes all necessary records. Generally, in most implementations, the external system will ignore duplicate records (i.e., already saved records matching the list pushed via the list refresh). Thus, however, the external system will likely include users who have been removed from the list.

For example, in an initial state, the DMS may transfer users A, B, and C to the external system. Before a list refresh, user D may be added to the DMS and user A may be removed. Thus the deltalog will have one addition (user D) and one deletion (user A). The presence of these may trigger a list refresh. In response, the DMS will transmit the new list of users (B, C, D) to the external system. The external system may recognize that is already has users B and C and will only persist user D, thus the external system will store users A, B, C, and D. Thus, at this point the external system and the DMS are out of sync.

In step 212, the method can include generating a change set. Further details of this process are described in FIG. 5 and not repeated herein. In general, however, the method can join the deltalog and dataset to obtain a list of new records and old records to determine which records have been added and deleted within a past time window. Continuing the previous example, the method can determine that User A was deleted, and User D was added.

In step 214, the method can include generating and issuing API calls based on the changeset.

In some implementations, an external system API may support adding and removing records via API calls. In some implementations, a connector stores a listing of these API endpoints and associates them with an add or delete action. In the embodiment, illustrated in FIG. 2, the method may only process deletion operations. However, in other embodiments, the method can process both addition or deletion operations.

Continuing the foregoing example, the method may discard added users in the changeset since the entire list of users was transmitted to the external system and thus can be presumed to exist. However, for the deleted user (User A), the method may generate an API call based on the connector's mapping of API endpoints and issue the API call to the external system. For example, the method may issue a Hypertext Transfer Protocol (HTTP) DELETE request to remove User A from the external systems' list of users. As a result, the external system will remove User A and obtain the canonical list of current users (B, C, D).

Figure 3:
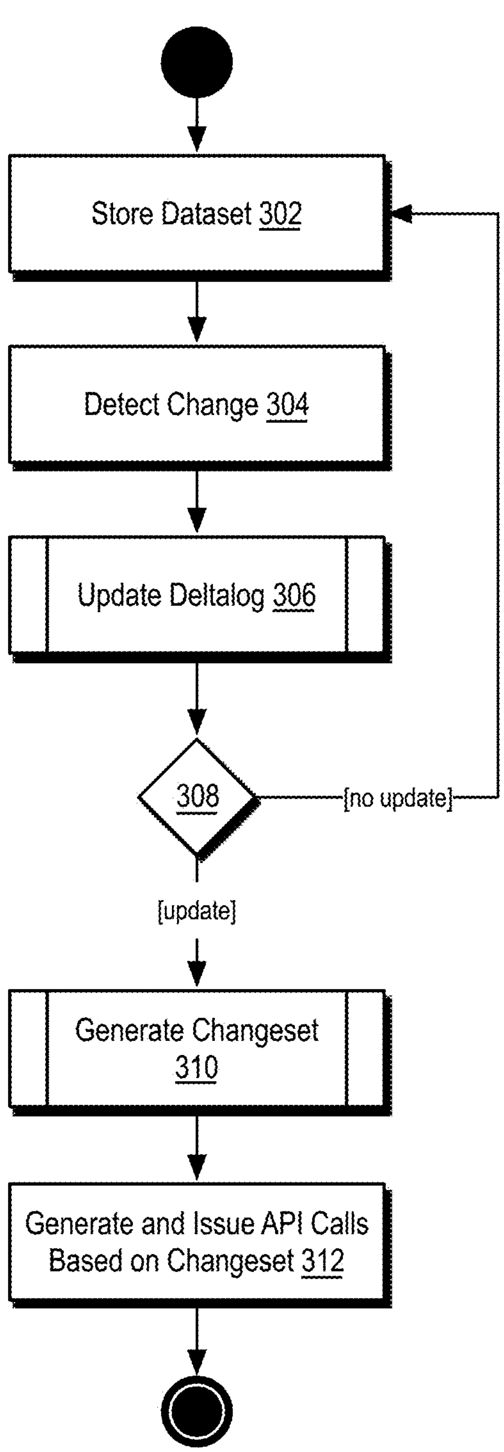
FIG. 3 is a flow diagram illustrating a deltalog-based approach to synchronizing dataset changes according to some embodiments of the disclosure.

FIG. 3 is a flow diagram illustrating a deltalog-based approach to synchronizing dataset changes according to some embodiments of the disclosure.

In step 302, the method stores a dataset. In step 304, the method detects a change in the dataset. In step 306, the method updates a deltalog in response to the change. Then, in step 308, the method determines if an update to an external system is needed. If not, the method returns to step 302. If so, the method proceeds to step 310. In some implementations, step 302, step 304, step 306, and step 308 may be performed as described with respect to step 202, step 204, step 206, and step 208, respectively. Details of those steps are not repeated herein but apply equally to their counterparts in FIG. 3.

Unlike FIG. 2, the method of FIG. 3 eschews sending a complete list update upon detecting an updated is needed. By contrast, in step 310, the method generates a change in response to detecting an update is needed. This step can performed as described in step 212 and that description is not repeated herein.

Next, in step 312, the method can include generating and issuing API calls to the external system based on the change set. This process is similar to step 214, although different in that additions are explicitly considered.

Specifically, since a complete list refresh is not transmitted, the external system stores an outdated list of records that may include errant users and not include new users. Thus, additions as well as deletions are required.

Continuing the previous example, the canonical dataset includes users B, C, and D while the list of users maintained by the external system includes users A, B, C. Based on the changeset, the connector can generate two API calls: one to add user D and one to remove user A. For example, an HTTP POST request can be issued to add user D and an HTTP DELETE request can be issued to remove user A. Thus, the method processes both additions and deletions, while avoiding a completely list refresh which may be a more time consuming request given the number of records.

FIG. 4 is a flow diagram illustrating a method for updating a deltalog according to some embodiments of the disclosure.

In step 402, the method can include getting or creating a deltalog table.

In some implementations, the method first attempts to retrieve an existing deltalog table via, for example, a storage service. This is accomplished by querying the storage service with specific identifiers, such as a tenant identifier and table references. The method can identify the relevant deltalog table based on these identifiers and retrieves it if it exists. This process ensures that if a current version of the deltalog table is available, it can be utilized without the need for creating a new instance.

Alternatively, if the deltalog table does not exist in the storage service, the method can create a new table. This can involve defining a schema that typically includes fields such as an id, updated-at timestamp, in-dataset flag, and committed-at timestamp, among others, as discussed above. In some implementations, the id field can be designated as the primary key, and the updated-at field may be used as a versioning attribute to track changes over time. This creation process not only facilitates the initial setup of the deltalog table but also ensures that the table structure is optimized for tracking changes in the data over time.

In some implementations, as part of step 402, the method can read the dataset corresponding to the deltalog as well. For example, the method can read a Parquet file or similar file storing the dataset.

In step 404, the method can include performing a left (outer) join between the deltalog table and a corresponding dataset.

In some implementations, a left join operation can be used to ensure comprehensive data coverage. Such a join can involve aligning the dataset with the deltalog based on a common identifier field, such as the identifier in the deltalog which corresponds to the identifier in the dataset. The method merges records from the dataset with those in the deltalog, where entries in the dataset are matched with corresponding entries in the deltalog based on the id. Due to the use of a join operation, if there are records in the dataset that do not have a corresponding entry in the deltalog, these records are still included in the result set, with the deltalog part being null. An alternative to the left join could be the use of other types of joins, such as inner joins or right joins, depending on the specific requirements of the data synchronization process. However, the left join may be used in scenarios where maintaining a complete picture of the dataset, including any new additions, is important. By merging the two data sources, the method facilitates the identification of discrepancies, new entries, or changes that need to be recorded in the deltalog, setting the stage for subsequent data management and update operations.

In step 406, the method can include identifying new rows present in the deltalog table.

Initially, the method can identify new entries by applying a filter to the joined dataset, created in step 404. This filter selects rows where the identifier field in the deltalog part (denoted as 'id') is null. For example, the deltalog id can be stored in the join table as "delt.id" and the condition can be set as "delt.id IS NULL" using SQL effectively identifying rows that are present in the dataset but absent in the deltalog, marking them as new additions. This identification highlights the data elements that need to be updated in the deltalog to maintain its currency and completeness.

Once these new rows are identified, the method proceeds to transform them into a format suitable for integration into the deltalog. This transformation is achieved using a customizable function that, for example, takes the identified new rows and processes them to conform to the schema and format of the deltalog. It may involve operations such as populating or updating fields like "updated-at" and "in-dataset," which are used for tracking the data's current state and its presence in the deltalog. The transformation of these new rows into the appropriate format ensures that they are ready for seamless integration into the deltalog.

In step 408, the method can include identifying missing rows in the deltalog table.

The method can begin by applying another filter to the joined dataset (formed in step 404) to identify rows that are missing in the dataset but exist in the deltalog. This can be achieved by locating rows where the identifier in the dataset part (for example, "dataset.id") is null in the joined dataset. In SQL, the condition "dataset.id IS NULL" can isolate those rows in the deltalog that do not have a corresponding entry in the dataset, signifying that these entries have been removed or are otherwise no longer relevant.

After identifying these rows, the method proceeds to prepare them for removal from the deltalog. This preparation involves using a transformation function which processes the identified rows to conform to the schema and format necessary for their removal. This transformation typically includes updating fields such as "updated-at" and "in-dataset," ensuring that these rows are correctly flagged and formatted for deletion.

In step 410, the method can include merging addition records to the deltalog table.

In step 410, the method involves consolidating the changes identified in the previous steps (step 406 and step 408) into the deltalog table. In some implementations, the process begins by creating a union of the addition records and deletion records. These records represent the new rows identified for addition to the deltalog (from step 406) and the rows marked for deletion (from step 408). By combining these two sets of entries, the method forms a comprehensive collection of all modifications to be applied to the deltalog.

This union operation can be performed in-memory and is crucial for efficiently managing the changes to be merged into the deltalog.

Once the union of addition and deletion entries is formed, the method can utilize a merge function to integrate these changes into the deltalog table. This merge operation can be executed using a command which takes the combined set of changes and applies them to the deltalog table. The merge function is designed to handle the complexities of updating the deltalog, ensuring that new additions are correctly inserted, and deletions are appropriately removed.

In some implementations, the method can further include a cleanup process that cleans up a deltalog when a modification is made using the above process. One of the functions of this process is a janitor operation which is responsible for updating the deltalog to commit rows based on a predefined time horizon. This can involve reviewing the timestamps of the entries in the deltalog and making decisions on committing or archiving these entries based on their age or relevance. This time-based management helps in keeping the deltalog current and prevents it from becoming overloaded with outdated information. Additionally, the cleanup process can include transformative operations on specific rows within the deltalog. These transformations may involve updating certain fields, such as the "committed-at" values, which indicate the time at which particular changes were committed to the deltalog. This updating ensures that the deltalog accurately reflects the latest state of the data it tracks, including the most recent modifications and their respective timestamps. Another aspect of the cleanup process is the selective deletion of rows from the deltalog. This operation targets rows that are no longer necessary or relevant, such as entries superseded by more recent updates or ones that fall outside the established time horizon for data retention. The final step in the cleanup process involves applying these transformations to the deltalog using a merge function, similar to the one described earlier.

Figure 5:
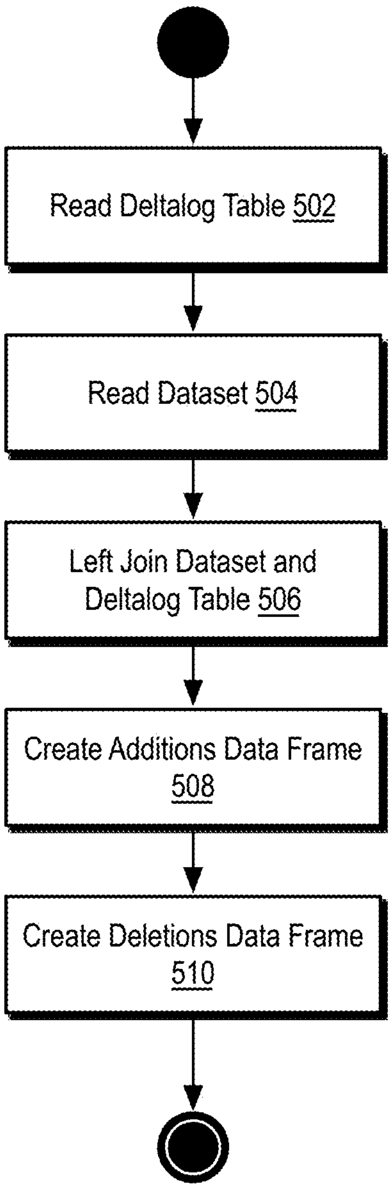
FIG. 5 is a flow diagram illustrating a method for computing a changeset according to some embodiments of the disclosure.

FIG. 5 is a flow diagram illustrating a method for computing a changeset according to some embodiments of the disclosure.

In step 502, the method can include reading the current deltalog table. In step 504, the method can include reading the dataset corresponding to the deltalog table. In step 506, the method can include performing a left outer join on the deltalog table and the dataset. Details of step 502, step 504, and step 506 are similar to that described with respect to step 402 and step 404 and are not repeated herein. In contrast, however, the method will generally not create a new deltalog table as one is presumed to exist as described in FIG. 2 and FIG. 3.

In step 508, the method can include creating an additions data frame.

Once the join is completed, the method proceeds to isolate the entries that should be added to the deltalog. This can be achieved by filtering the joined data to create a subset where the conditions "in-dataset=true" and "committed=false" are met in the deltalog. This filter effectively selects those rows that are marked as being part of the dataset but not yet committed to the deltalog, signifying that these are new or updated entries that need to be added. The "in-dataset" flag is an indicator that indicates whether a given row is still present in the dataset being evaluated. For example, if a deltalog row includes a row having in-dataset set to false, that row is retained and used to create a deletions data frame. In some implementations, the "committed" flag indicates whether the entry has already been processed and added to the deltalog.

By creating this additions data frame, step 508 ensures that the changeset accurately represents all new and relevant data entries that need to be updated in the external system.

In step 510, the method can include creating a deletions data frame.

Building upon the left outer join performed in step 506, the method here isolates entries from the joined dataset that are marked for deletion. This isolation is achieved by applying a filter to the joined data to select rows where the conditions "in-dataset=false" and "committed=false" are set in the deltalog. The "in-dataset=false" condition identifies rows that are no longer relevant or present in the dataset but are still present in the deltalog. Meanwhile, "committed=false" ensures that the rows selected for deletion have not been processed for removal previously.

The selected entries form the deletions data frame. This frame is comprised of keys or identifiers, at minimum, which are required to execute deletions in the external system. The deletions data frame essentially represents the set of data that needs to be removed to align the deltalog with the current state of the dataset.

Once the addition and deletions data frames are created, it can be used to define the API calls for updating the external system as described more fully in FIG. 2 and FIG. 3.

Figure 6:
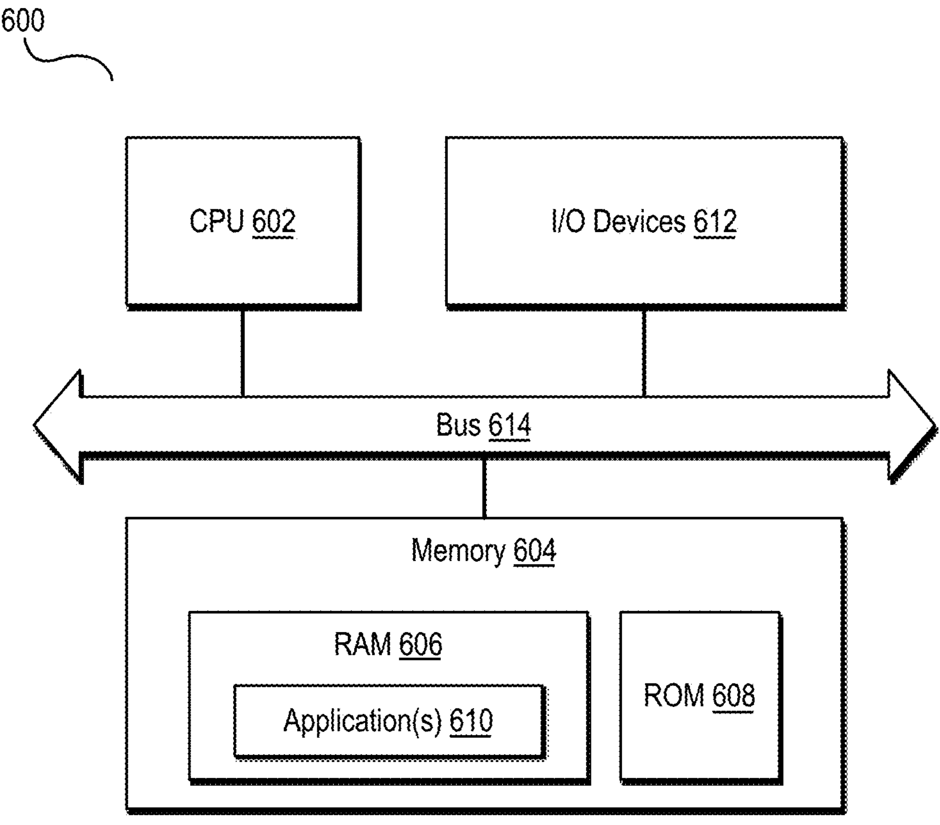
FIG. 6 is a block diagram of a computing device according to some embodiments of the disclosure.

FIG. 6 is a block diagram of a computing device according to some embodiments of the disclosure.

As illustrated, the device 600 includes a processor or central processing unit (CPU) such as CPU 602 in communication with a memory 604 via a bus 614. The device also includes one or more input/output (I/O) or peripheral devices 612. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of, or in combination with, a CPU 602. Memory 604 may comprise a memory system including a dynamic random-access memory (DRAM), static random-access memory (SRAM), Flash (e.g., NAND Flash), or combinations thereof. In one embodiment, the bus 614 may comprise a Peripheral Component Interconnect Express (PCIe) bus. In some embodiments, the bus 614 may comprise multiple busses instead of a single bus.

Memory 604 illustrates an example of a non-transitory computer storage media for the storage of information such as computer-readable instructions, data structures, program modules, or other data. Memory 604 can store a basic input/output system (BIOS) in read-only memory (ROM), such as ROM 608 for controlling the low-level operation of the device. The memory can also store an operating system in random-access memory (RAM) for controlling the operation of the device.

Applications 610 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth®, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A system comprising:

a database storing a dataset, the database comprising a persistent storage device; and a connector, the connector comprising a computing device configured to access data stored in the database and transfer data and commands to an external system, the connector configured to:

update a deltalog responsive to a change in the dataset, the deltalog storing one or more of additions or deletions to data in the dataset, determine, by the connector and based on the deltalog, that a list refresh is needed for the external system, compute a changeset based on the deltalog and the dataset, the changeset representing one or more of additions or deletions to the dataset, wherein computing the changeset comprises reading a current deltalog table, performing a left join on the current deltalog table and the dataset to obtain a joined dataset, creating an additions data frame based on new rows in the joined dataset, and creating a deletions data frame based on missing rows in the joined dataset, and issue at least one application programming interface call to the external system based on the additions data frame and the deletions data frame to update a list of records stored by the external system.

2. The system of claim 1, wherein issuing at least one application programming interface call to the external system based on the changeset comprises:

issuing a first application programming interface call to the external system to replace the list of records with a new list of records stored in the dataset; and issuing one or more addition or deletion application programming interface calls to the external system to update of records stored by the external system.

3. The system of claim 1, wherein issuing at least one application programming interface call to the external system based on the changeset comprises:

generating a set of addition or deletion application programming interface calls based on the changeset; and issuing the set of addition or deletion application programming interface calls to the external system to update of records stored by the external system.

4. The system of claim 1, wherein updating a deltalog responsive to a change in the dataset comprises:

retrieving a current deltalog table;

performing a left join on the current deltalog table and the dataset to obtain a joined dataset;

identifying new rows in the joined dataset;

identifying missing rows in the joined dataset; and merging addition records based on the new rows to the current deltalog table.

5. The system of claim 1, wherein updating a deltalog responsive to a change in the dataset comprises:

updating a plurality of rows in a deltalog table based on a committed field;

deleting a plurality of rows based on the committed field; and persisting the deltalog table.

6. The system of claim 1, wherein determining that a list refresh is needed for the external system comprises one of periodically checking to determine if the list refresh is needed based on the deltalog or determining that the list refresh is needed upon detecting a change in the dataset.

7. A method comprising:

updating a deltalog responsive to a change in a dataset, the deltalog storing one or more of additions or deletions to data in the dataset;

determining, by a connector comprising a computing device and based on the deltalog, that a list refresh is needed for an external system;

computing a changeset based on the deltalog and the dataset, the changeset representing one or more of additions or deletions to the dataset, wherein computing the changeset comprises reading a current deltalog table, performing a left join on the current deltalog table and the dataset to obtain a joined dataset, creating an additions data frame based on new rows in the joined dataset, and creating a deletions data frame based on missing rows in the joined dataset; and issuing, by the connector, at least one application programming interface call to the external system based on the additions data frame and the deletions data frame to update a list of records stored by the external system.

8. The method of claim 7, wherein issuing at least one application programming interface call to the external system based on the changeset comprises:

issuing a first application programming interface call to the external system to replace the list of records with a new list of records stored in the dataset; and issuing one or more addition or deletion application programming interface calls to the external system to update of records stored by the external system.

9. The method of claim 7, wherein issuing at least one application programming interface call to the external system based on the changeset comprises:

generating a set of addition or deletion application programming interface calls based on the changeset; and issuing the set of addition or deletion application programming interface calls to the external system to update of records stored by the external system.

10. The method of claim 7, wherein updating a deltalog responsive to a change in the dataset comprises:

retrieving a current deltalog table;

performing a left join on the current deltalog table and the dataset to obtain a joined dataset;

identifying new rows in the joined dataset;

identifying missing rows in the joined dataset; and merging addition records based on the new rows to the current deltalog table.

11. The method of claim 7, wherein updating a deltalog responsive to a change in the dataset comprises:

updating a plurality of rows in a deltalog table based on a committed field;

deleting a plurality of rows based on the committed field; and persisting the deltalog table.

12. The method of claim 7, wherein determining that a list refresh is needed for the external system comprises one of periodically checking to determine if the list refresh is needed based on the deltalog or determining that the list refresh is needed upon detecting a change in the dataset.

13. A non-transitory computer-readable storage medium for tangibly storing computer program instructions capable of being executed by a computer processor, the computer program instructions defining steps of:

updating a deltalog responsive to a change in a dataset, the deltalog storing one or more of additions or deletions to data in the dataset;

determining, by a connector comprising the computer processor and based on the deltalog, that a list refresh is needed for an external system;

computing a changeset based on the deltalog and the dataset, the changeset representing one or more of additions or deletions to the dataset, wherein computing the changeset comprises reading a current deltalog table, performing a left join on the current deltalog table and the dataset to obtain a joined dataset, creating an additions data frame based on new rows in the joined dataset, and creating a deletions data frame based on missing rows in the joined dataset; and issuing, by the connector, at least one application programming interface call to the external system based on the additions data frame and the deletions data frame to update a list of records stored by the external system.

14. The non-transitory computer-readable storage medium of claim 13, wherein issuing at least one application programming interface call to the external system based on the changeset comprises:

issuing a first application programming interface call to the external system to replace the list of records with a new list of records stored in the dataset; and issuing one or more addition or deletion application programming interface calls to the external system to update of records stored by the external system.

15. The non-transitory computer-readable storage medium of claim 13, wherein issuing at least one application programming interface call to the external system based on the changeset comprises:

generating a set of addition or deletion application programming interface calls based on the changeset; and issuing the set of addition or deletion application programming interface calls to the external system to update of records stored by the external system.

16. The non-transitory computer-readable storage medium of claim 13, wherein updating a deltalog responsive to a change in the dataset comprises:

retrieving a current deltalog table;

performing a left join on the current deltalog table and the dataset to obtain a joined dataset;

identifying new rows in the joined dataset;

identifying missing rows in the joined dataset; and merging addition records based on the new rows to the current deltalog table.

17. The non-transitory computer-readable storage medium of claim 13, wherein updating a deltalog responsive to a change in the dataset comprises:

updating a plurality of rows in a deltalog table based on a committed field;

deleting a plurality of rows based on the committed field; and persisting the deltalog table.

* * * * *